H. F. STORY.
POWER TRANSMISSION.
APPLICATION FILED AUG. 19, 1915.
1,243,640.
Patented Oct. 16, 1917.
6 SHEETS—SHEET 1.
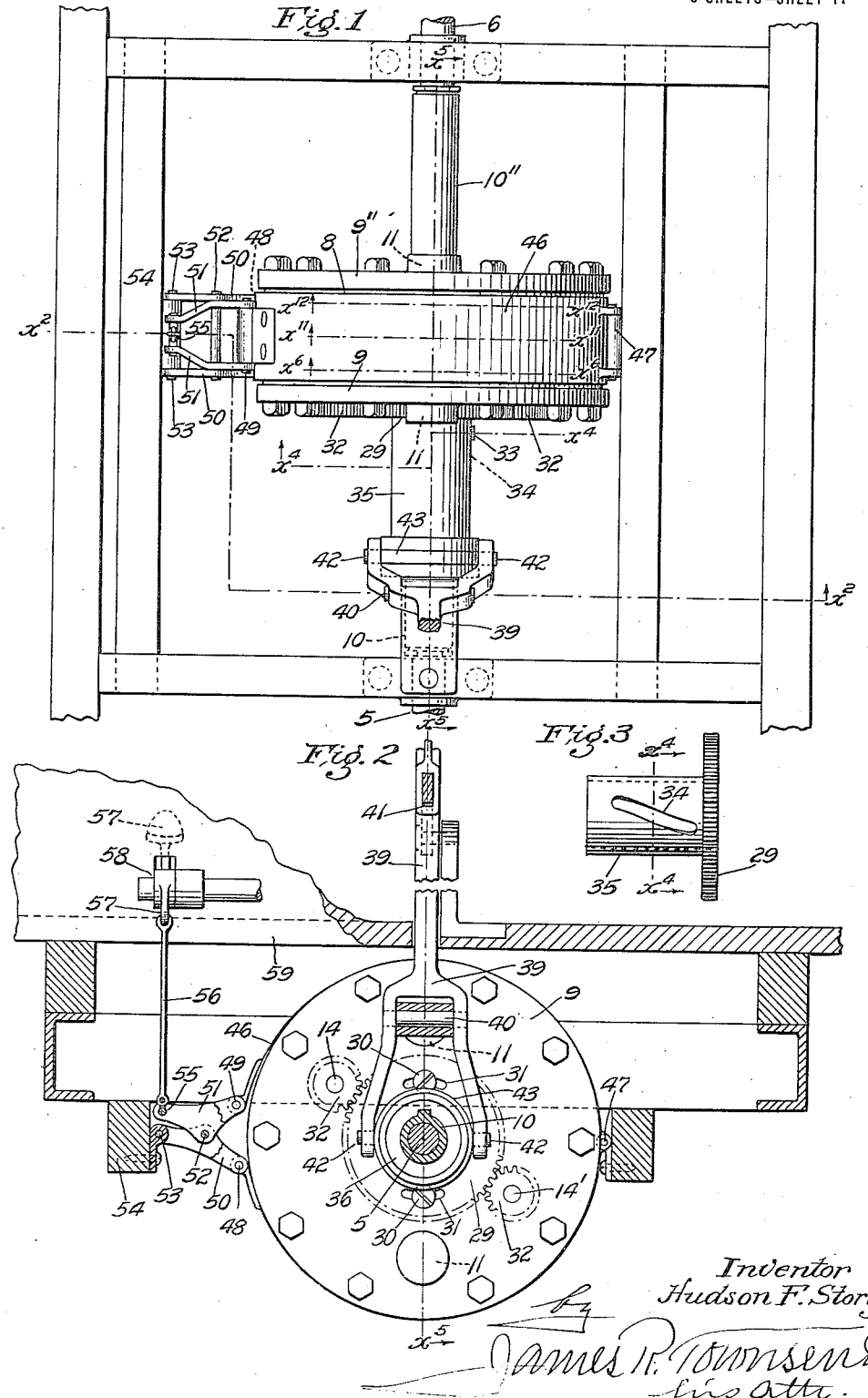
Inventor
Hudson F. Story
James R. Townsend
his atty.

H. F. STORY.
POWER TRANSMISSION.
APPLICATION FILED AUG. 19, 1915.
1,243,640.
Patented Oct. 16, 1917.
6 SHEETS—SHEET 2.
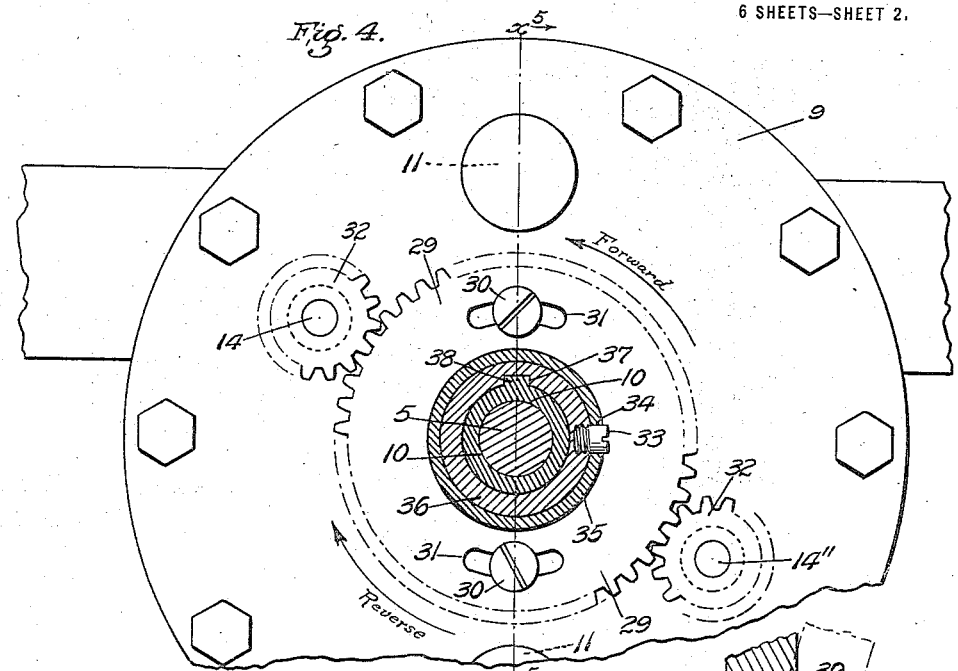
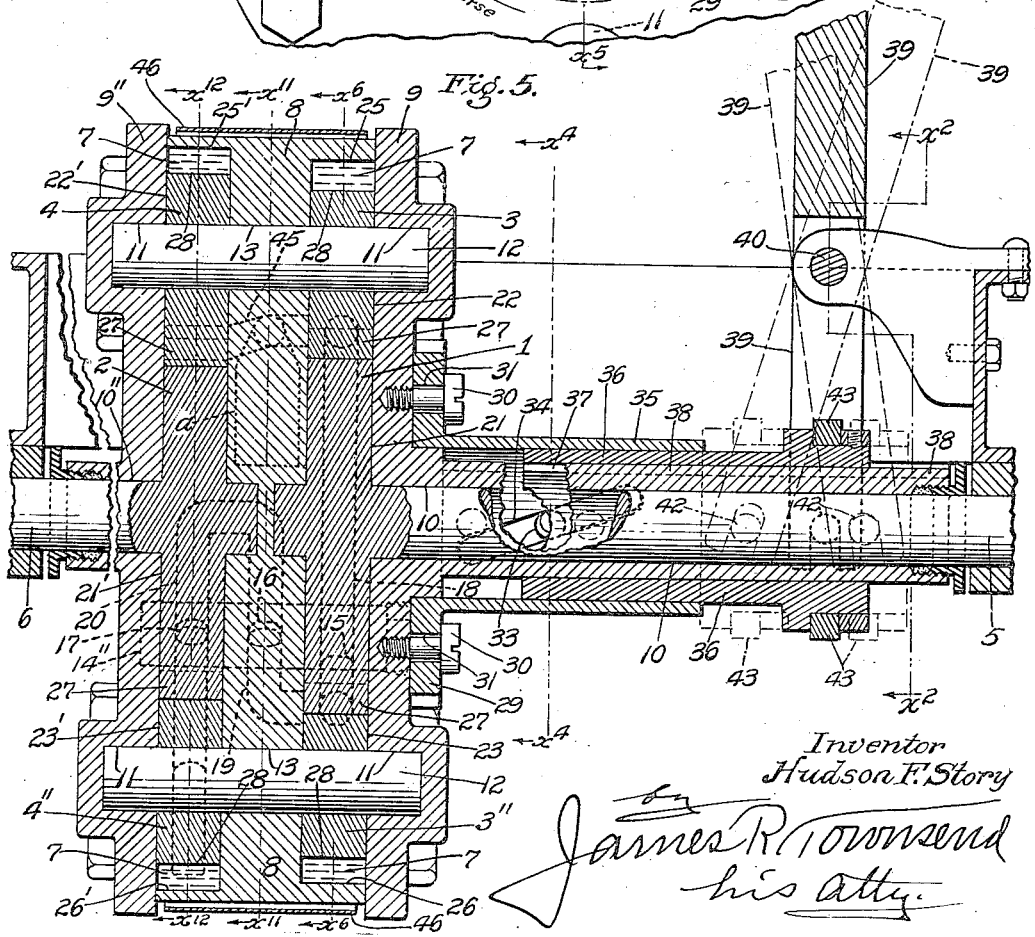
Inventor
Hudson F. Story
James R. Townsend
his atty.

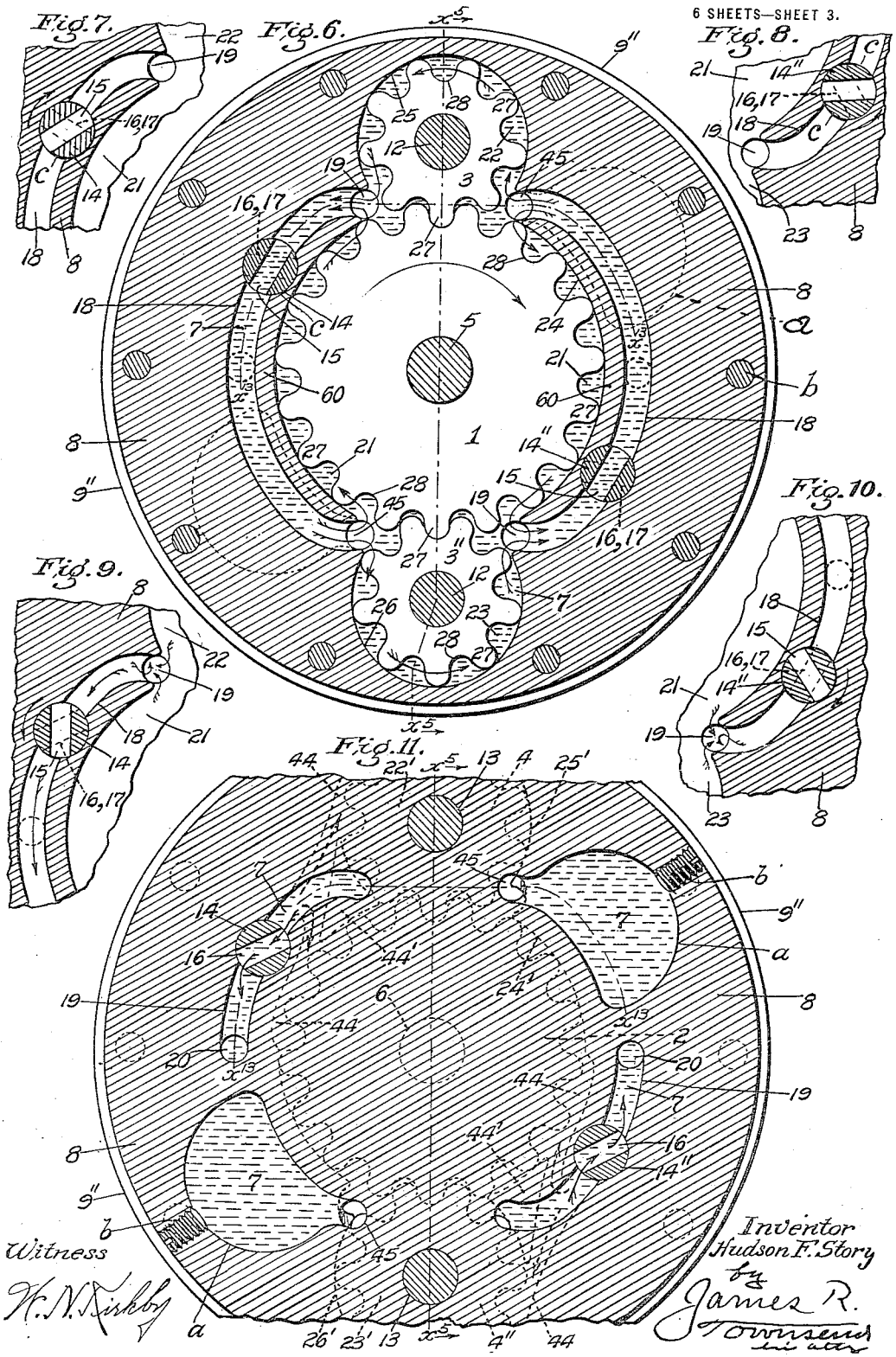

H. F. STORY.
POWER TRANSMISSION.
APPLICATION FILED AUG. 19, 1915.

1,243,640.

Patented Oct. 16, 1917.
6 SHEETS—SHEET 4.

Witness
H. N. Kirkby

Inventor
Hudson F. Story
by James R. Townsend
his atty.

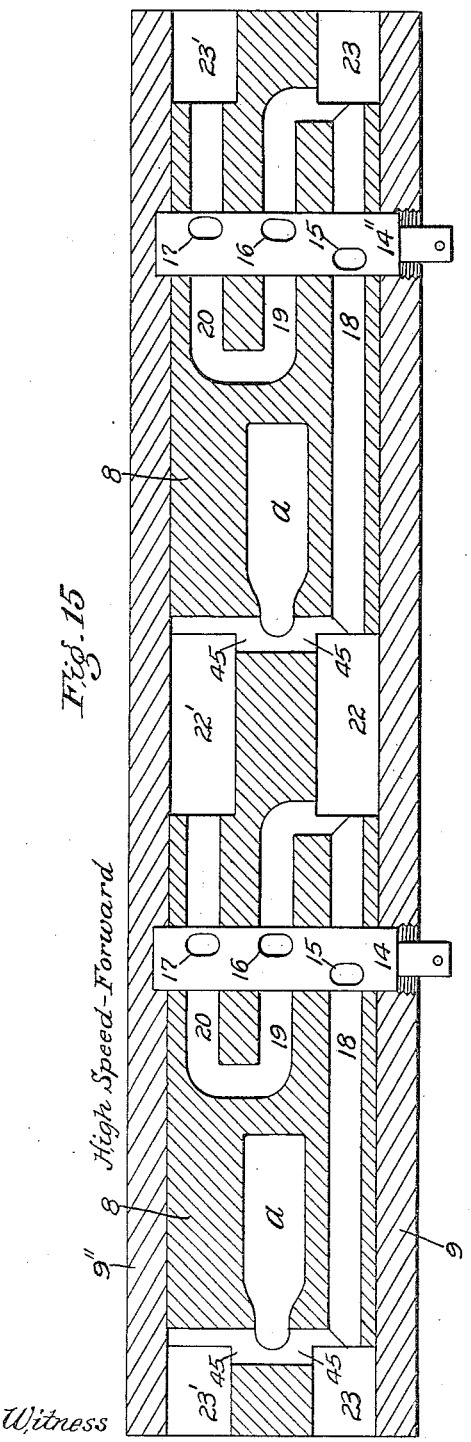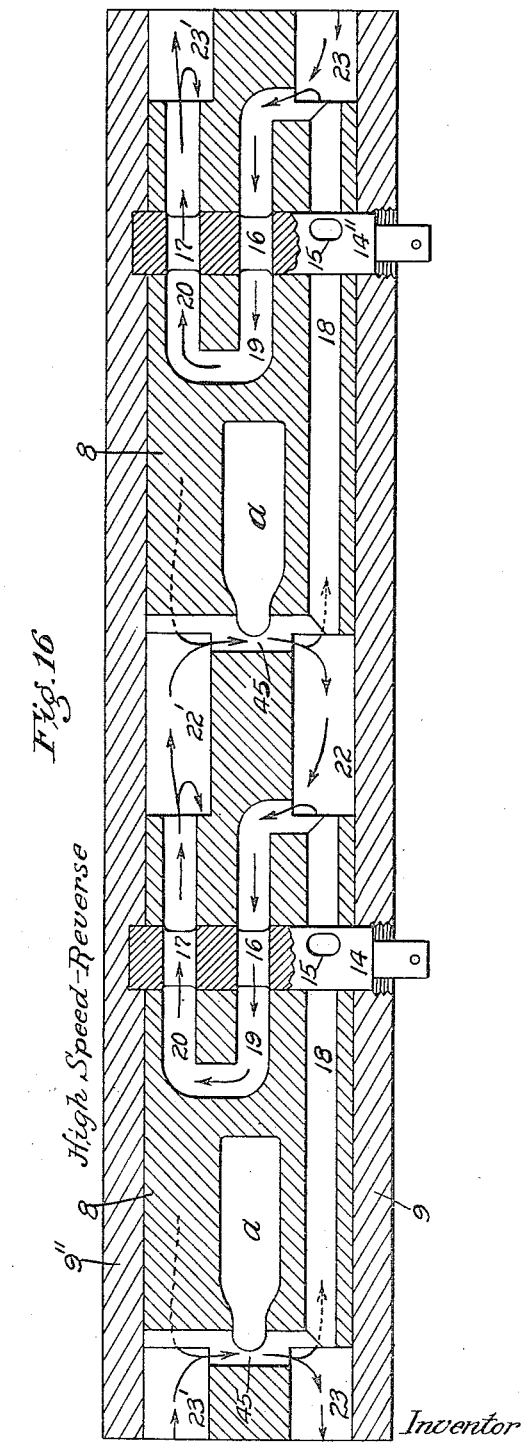

UNITED STATES PATENT OFFICE.

HUDSON F. STORY, OF HIGHLAND, CALIFORNIA, ASSIGNOR OF ONE-HALF TO JOHN D. BOLEY, OF HIGHLAND, CALIFORNIA.

POWER TRANSMISSION.

1,243,640.   Specification of Letters Patent.   Patented Oct. 16, 1917.

Application filed August 19, 1915. Serial No. 46,374.

*To all whom it may concern:*

Be it known that I, HUDSON FAVOR STORY, a citizen of the United States, residing at Highland, in the county of San Bernardino and State of California, have invented a new and useful Power Transmission, of which the following is a specification.

An object of this invention is to provide means whereby power from a motor may be transmitted at variable speeds and in different directions, and also whereby a brake may be applied to control the motion as required.

An object is to make provision whereby the speed of the driven shaft may be gradually changed and may be regulated with perfect exactness, so that the invention will be applicable to power shafts for any machine as for lathes, drill presses and the like as well as for automobiles and other vehicles.

An object is to provide a power transmission for automobiles or the like which will give the driver perfect speed control over his machine.

An object is to provide a power transmission of great simplicity and few parts and capable of being perfectly controlled as to speed.

Other objects are combined lightness and strength of construction and ease and certainty of operation.

Further objects and advantages may appear from the subjoined detail description.

The accompanying drawings illustrate the invention.

Figure 1 is a plan view of a transmission embodying this invention and applied to an automobile frame, a portion of which is shown. The operating parts are shown in forward drive position.

Fig. 2 is a fragmental sectional end elevation viewed from line $x^2$, Figs. 1 and 5, together with the transmission brake and its operating connection.

Fig. 3 is an elevation of the valve-actuating element.

Fig. 4 is an enlarged fragmental end elevation viewed from line $x^4$, Figs. 1, 3 and 5; parts being shown in neutral position. The arrows respectively show the directions in which the valve-actuating element must be turned for forward and reverse drive.

Fig. 5 is a longitudinal mid-section on line $x^5$, Figs. 1, 2, 4, 6, 11 and 13, parts being shown by solid lines in neutral position corresponding to the position shown in Fig. 4. Dot-and-dash lines and broken lines indicate forward and reverse drive positions respectively.

Fig. 6 is a transverse section on line $x^6$, Figs. 1, 5 and 13 showing parts in neutral position.

Fig. 7 is a fragmental sectional detail showing the position of one of the valves at moderate speed direct or forward drive; said valve being turned to shut off the circulation indicated in Fig. 6.

Fig. 8 is a fragmental sectional detail of the opposite valve turned to full speed forward drive.

Fig. 9 is a fragmental sectional detail of the valve shown in Fig. 7 in low speed reversed position.

Fig. 10 is a fragmental sectional detail of the opposite valve at full speed reversed.

Fig. 11 is a fragmental transverse section on line $x^{11}$, Figs. 1, 5 and 13 cutting through the partition between the impeller chambers and showing the valves in position to open the circulating by-pass corresponding to the position of Fig. 9.

Figure 12:
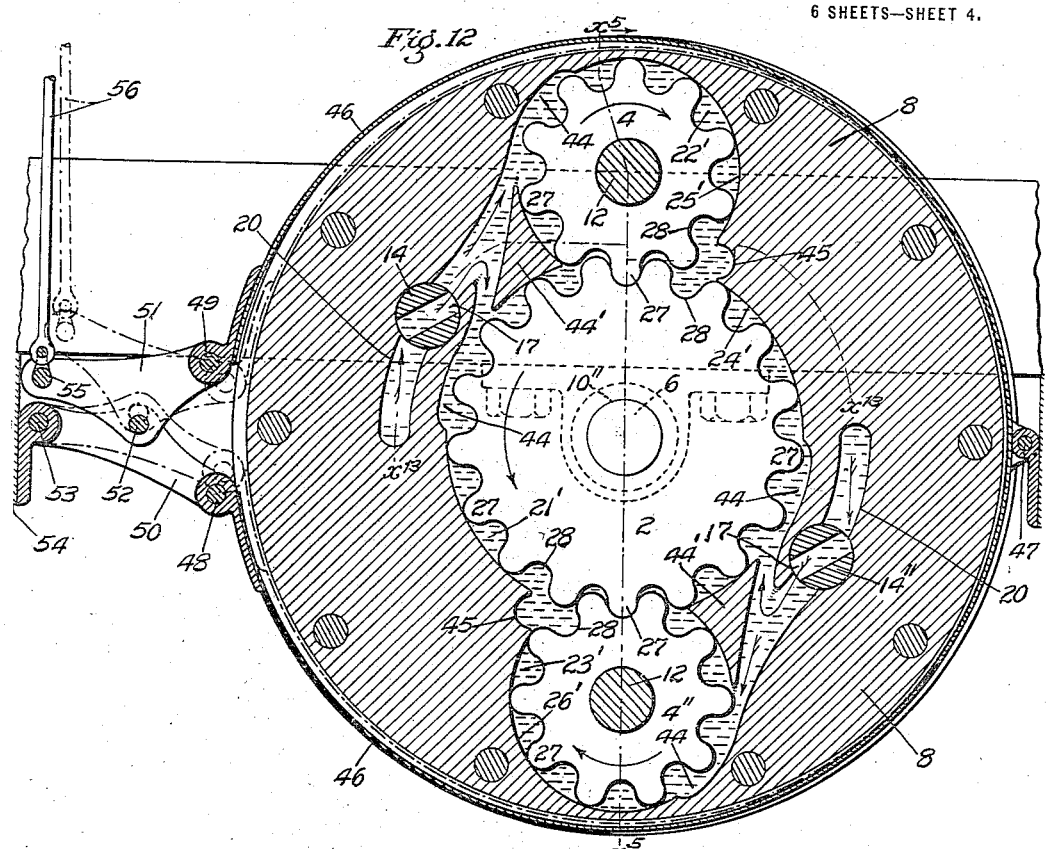
Figure 13:
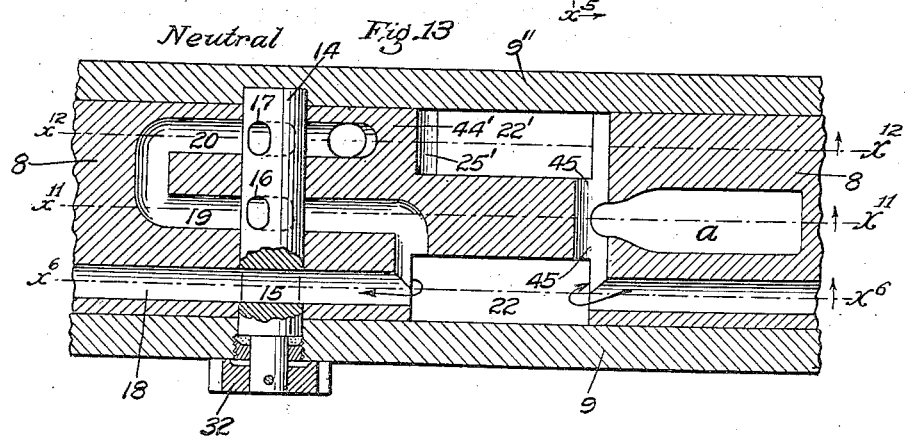

Fig. 12 is a transverse section on line $x^{12}$, Figs 1, 5 and 13, showing the second set of gears of the reverse drive and also showing the valves turned to operate the drive at moderate speed. In this view the brake band is shown mounted in place together with a portion of its operating connections. Dot-and-dash lines indicate a braking position of the band.

Fig. 13 is a fragmental developed sectional view on curved line $x^{13}$, Figs. 6, 11 and 12.

Figure 14:
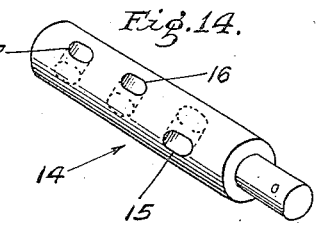

Fig. 14 is a perspective view of one of the operating valves detached.

Fig. 15 is a circumferential development analogous to Fig. 13 illustrating the forward drive.

Fig. 16 is a development analogous to Fig. 15 illustrating the reverse drive.

Figure 17:
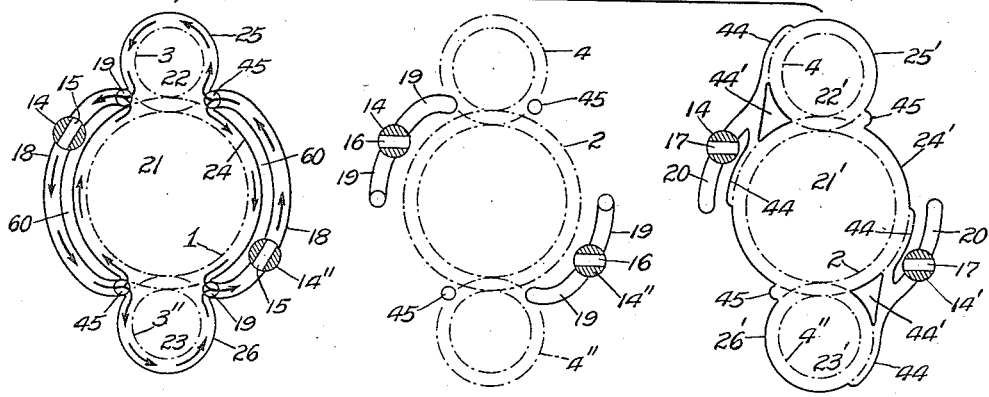
Figure 18:
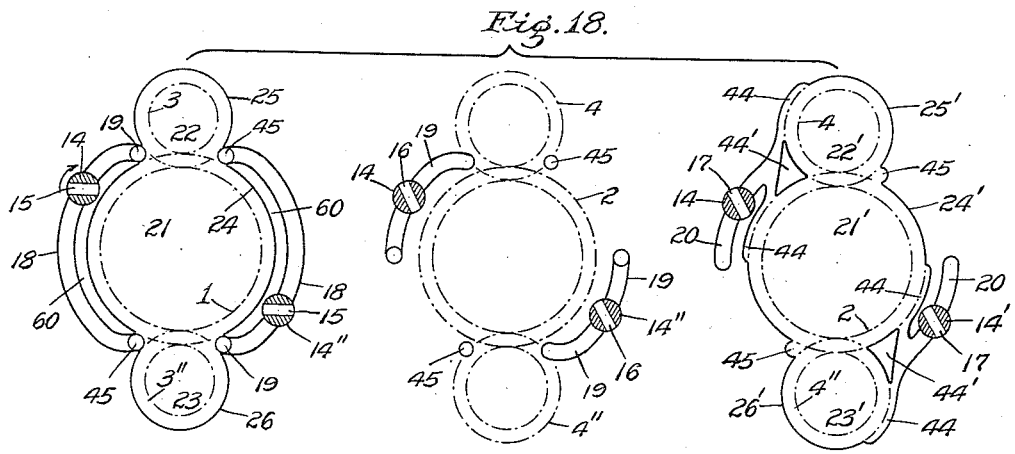
Figure 19:
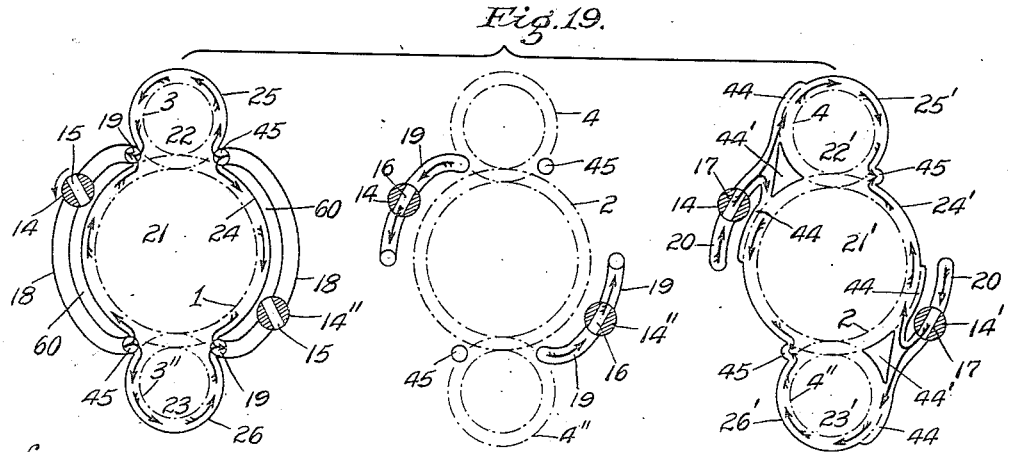

Figs. 17, 18 and 19 are diagrams illustrating the valve-positions for the neutral, the direct forward and the reverse drive respectively viewed from the three sectional planes indicated at lines $x^6$, $x^{11}$ and $x^{12}$ in Figs. 5 and 13.

The invention involves the connection of a three-geared rotary piston motor to a three-geared rotary piston pump by a circulating liquid transmission element, and controlling the transmission element to drive the motor either way, to stop the motor, and to vary the speed of the motor while the pump is running practically constant in one direction.

The three-geared rotary pump piston comprises the primary central gear 1 and the secondary gears 3 and 3'' mounted diametrically opposite each other and meshing with the primary gear. The three-geared rotary motor piston comprises the primary central gear 2 and the secondary gears 4 and 4'' mounted diametrically opposite each other and meshing with the primary gear. The two rotary pistons are mechanically alike. In relation to each other the pump is the driver and the motor is the driven. The three-gear construction has obvious advantages over the old two-gear construction, such as balancing, etc., and has other advantages in the matter of connecting together by means of a liquid transmission element, as will hereinafter appear.

The power shaft 5 may lead from and be connected with any motive source as a gas engine, steam engine, electric motor or the like not shown, and is connected with the gear 1 which is in mesh with the gears 3, 3''. The gear 2 is connected with the power-transmitting shaft 6 and is combined with the gears 4, 4'' to receive power from the liquid power transmission element. The liquid transmission element 7, which may be a body of oil or any other suitable fluid by which the power may be transmitted from one side to the other, operatively connects the pistons; and a channel made up of various limbs and parts and containing the liquid transmission element of the pistons, and holding said liquid transmission-element in operative relation with said pistons, is provided; the walls of said channel being formed by the main body 8 and the caps 9 and 9'' therefor connected by bolts $b$ and constituting a housing for the pistons. Said caps are constructed with suitable bearings 10 and 10'' for the shafts 5 and 6 respectively and are also provided with bearings or seats 11 for the shafts 12 which respectively carry the gears 3, 3'' and 4, 4''; said shafts also extending through bearings or seats 13 in the body 8. The gears 3, 3'' and 4, 4'' are free to turn upon their respective shafts.

Said channel is controlled by suitable means as the valves 14 and 14'', which in one position allow a portion of the liquid element to be circulated by the pump and holds another portion of said element stationary to prevent rotation of the motor relative to the housing.

For convenience of construction and operation each of said valves intersects three limbs of the channel as clearly seen in Figs. 13, 14, 15 and 16, and is provided with three transverse ports 15, 16 and 17, one of which, as port 15, is arranged not to register with its limb 18 of the channel when the other two ports 16 and 17 register with their limbs 19 and 20 of the channel. Said ports 16 and 17 are parallel to each other and the plane of their axes extends across the axis of the port 15 at an angle of 60 degrees so that two opposite segments $c$ of the valve are closed.

Said channel is formed with chambers for the pump and motor gears respectively, there being a set of chambers for each set of gears, and the gears form stops for the channel in their respective chambers 21, 22, 23 and 21', 22' and 23'. The walls 24, 24', 25, 25', and 26, 26' for said chambers are practically of a common radius with the gears respectively contained in said chambers, so that the teeth 27 of said gears practically close the channel with said walls against the liquid element except as to so much of such element as is contained in the space 28 between said teeth, so that the amount of the liquid element which may pass through the channel around the gears is determined by the rotation of the gears and the position of the valves. The flow of the liquid element through the channel is controlled by the position of the valves and means are provided to rotate the valves sufficiently to change the position of their ports 15, 16, 17 relative to the limbs of the channel with which said ports register.

Means are provided to simultaneously oscillate the valves to open or close the ports with relation to the channel limbs with which they register. Said means comprise an oscillating valve gear 29 secured by cap-screws 30 to one of the caps 9 of the body. Said cap-screws 30 extend through slots 31 in the valve gear 29 and hold said gear in position on the cap 9. Said valve gear is in mesh with valve pinions 32 and is connected with a pin-and-diagonal slot connection 33, 34, the slots 34 thereof being in a sleeve 35 connected to the oscillating gear 29 and surrounding the operating sleeve 36, the bearing 10 and the shaft 5; said operating sleeve 36 being provided with the pins 33 that work in a rectilinear path along the shaft 5 and act upon the spiral ways formed by the slots 34 so as to oscillate the valve gear and the valves, as may be required to control the speed and power transmission.

The sleeve 36 is provided with a splineway 37 in which a spline 38 of the sleeve-like bearing 10 engages to prevent relative rotation of these two parts; said sleeve 36 being connected with a bifurcated lever 39 that is pivoted at 40 and held in operative relation by means of a sector catch 41, see Fig. 2. The lever 39 engages pins 42 of a non-rotatable collar 43 that is operative to move the sleeve 36 along the bearing 10, thus to cause the pin 33 acting through the slots 34 to oscillate the sleeve 35 and the gear 29 connected therewith, thus to rotate the valves in proportion to the movement of the lever 39.

The ports 15 of the valves for the pump, are arranged transversely of the ports 16 and 17 that control the limbs 19 and 20 of the channel which leads from the chambers 21, 22 and 23 of said channels to the chambers 21', 22' and 23'. Counterbalancing chambers 44 are provided at opposite sides of the chambers of the motor gears so that the liquid pressure when directed upon said gears will counterbalance; thus to avoid as much as possible side thrust against said pistons and consequently lateral pressure upon the bearings.

Corner blocks 44' are arranged at the junction of the motor gears on their power-receiving sides respectively for the purpose of directing the power-transmission liquid appropriately to effect the desired operation.

Return limbs 45 connect the chambers 22, 22' and 23, 23' respectively upon that side of the junction of the motor gears opposite the corner blocks 44'; the circulation passing from chambers 21, 22, 23 through the limbs 19, 20, to chambers 21', 22', 23', and returning again through said limbs 45 to chambers 21, 22 and 23.

Suitable reservoir means to supply the channel with the liquid transmission element is provided, which, in the instance shown, comprises oppositely-arranged reservoirs $a$ in the body 8 that are each in communication with a respective limb 45 of the channel said reservoirs having plugged inlets $b$ through which the liquid transmission element may be introduced and also may be drawn off from time to time as occasion requires.

A brake band 46, pivoted at 47 intermediate its free ends, is held by said pivot from the periphery of the body 8, and said free ends are pivoted at 48, 49 to levers 50 and 51. Said levers 50 and 51 are pivoted together by a pin 52; one of said levers 50 being pivoted at 53 to a solid support 54, while the other lever 51 is connected by a pivotal link 55 to a connecting rod 56 operated by any suitable means as by a foot-lever 57 pivoted at 58 to a suitable support as the car body 59. (See Fig. 2).

Partitions 60 on opposite sides of the chamber 21 are provided to separate between said chamber 21 and the channels 18, with which the ports 15 of the respective valves 14, 14'' register, so that the liquid transmission-element may circulate in opposite directions between the junctions of the pump gears 1, 3 and 3'' on diametrically opposite sides of the primary gear 1.

In practical operation when the attendant desires to allow the driving shaft 5 to run without operating the driven shaft 6, the lever 39 is brought to the neutral position shown by solid lines in Fig. 5, thus bringing the valves into the position shown in Figs. 6 and 17 where it is seen that the ports 15 register with the limbs 18 while the other two ports 16 and 17 are across, and are closed to their limbs 19 and 20 respectively of the channel.

The result of this is that when the driving shaft operates the primary pump gear 1, the liquid transmission-element is driven in a continuous circulation around the gears 1, 3 and 3'' inside the walls of the three chambers containing said gears; one-half of the liquid transmission-element in circulation flowing through one of the channel limbs 18 and the other half through the other of the channel limbs 18 extending part way around the primary pump gear 1. The liquid circulating through the channel limbs 18, 18 respectively is divided at the junction of the primary gear and one of the secondary gears; one-half of the liquid being carried by the teeth of the primary gear back in parallelism with the limb 18 on one side of the primary gear 1 while the other half is carried by the teeth of the secondary gears and delivered to the companion channel 18 on the other side of the primary gear 1 where it mingles with liquid conveyed within the spaces between the teeth.

The entire circulation of liquid put in motion by the pump gears 1, 3 and 3'' is all accomplished within the chambers 21, 22, 23 and the opposite limbs 18, 18 of the channel; and, consequently, no transmission of power is made to the motor gears.

When it is desired to drive the machine forward the lever 39 will be moved toward the dot-and-dash position shown in Fig. 5, thus gradually moving the valves into the position shown in Fig. 7, gradually closing the passage in the limbs 18 while the circulation through 19 and 20 is blocked as indicated by the dotted lines for the ports 16, 17 in Fig. 7. While the liquid around the motor gears 2, 4 and 4'' is blocked as shown in Fig. 18 there is no relative movement between the body 8 and the driven shaft 6. Consequently, as the circulation of the liquid through the channels 18 is cut off, the power from shaft 5 is transmitted to the body 8 to rotate it; said power is also transmitted to the shaft 6 in the same measure. Therefore, as the valves 14, 14'' are turned to close the ports 15 without opening the ports 16, 17 the speed of the shaft 6 gradually accelerates until the complete closing of the ports 15 while the ports 16 17 are closed, at which position the shafts 5 and 6 will rotate as a unit. This position is shown in Figs. 8 and 18.

To drive the shaft 6 reversely to shaft 5 the operator will first move the lever 39 to neutral position shown in solid lines in Fig. 5 and will apply the brake to stop the body 8 from rotating. Then the lever 39 will be moved toward the position shown in dash lines in Fig. 5, thus rotating the valves 14 into a position corresponding to that shown in Figs. 11 and 12, thus admitting liquid to effectively act upon the motor to drive it in a direction reverse to shaft 5, thereby rotating shaft 6 at a comparatively low speed which may be increased by further movement of the lever until the port 17 is fully open as indicated in Fig. 19 at which time the port 15 will be closed as shown in Fig. 18, and therefore all of the liquid driven by the pump will be utilized to drive the motor whereby the speed of the reversely rotating shaft 6 will be the same as that of shaft 5.

The driving shaft 5, and the driven shaft 6 and their primary gears 1, 2 are preferably axially alined so that corresponding secondary gears 3, 4 or 3″, 4″ for the two sets may be mounted upon a common shaft as shown.

Briefly, the driving shaft and the driven shaft are mounted in longitudinal alinement, a three gear rotary piston pump is connected to the driving shaft, a three gear rotary piston motor is connected to the driven shaft, a liquid passes through the pump and through the motor, there being means for reversing the direction through the motor to reverse the motor without reversing the pump, the pump and motor being in a housing rotatably mounted upon the shafts, there being means for closing the passage through the motor to rotate the housing thereby connecting the shafts directly together through the means of the housing, and there being a variable by-pass to vary the flow through the motor and regulate the motor without changing the speed of the pump. Thus the power transmission spans the gap between and overlaps the near, inner or adjacent ends of the driving shaft and the driven shaft.

I claim:—

1. In a power transmission, a driving shaft, a driven shaft in longitudinal alinement with the driving shaft, a housing upon the near ends of said shafts, a three gear rotary pump piston upon the end of the driving shaft in the housing, a three gear rotary motor piston upon the end of the driven shaft in the housing; a transmission liquid chambered in the housing, there being ports leading the liquid to the receiving side of the pump piston, ports leading from the two discharge sides of the pump piston to two sides of the motor piston, ports leading from the two sides of the motor piston, and ports forming two by-passes for the pump piston; means for reversing the direction of pressure from the pump upon the motor, and means controlling the by-passes to vary the flow through the motor.

2. In a power transmission, a driving shaft, a driven shaft in longitudinal alinement with the driving shaft, a housing upon the near ends of said shafts, a three gear rotary pump piston upon the end of the driving shaft in the housing, a three gear rotary motor piston upon the end of the driven shaft in the housing; a transmission liquid chambered in the housing, there being ports leading the liquid to the receiving side of the pump piston, ports leading from the discharge side of the pump piston to two sides of the motor piston, ports leading from the two sides of the motor piston, and ports forming two by-passes for the pump piston; means for reversing the direction of pressure from the pump upon the motor, means controlling the by-passes to vary the flow through the motor, and means for stopping the flow through the motor with the by-passes closed, so as to rotate the housing.

3. In a power transmission, a driving shaft, a driven shaft in longitudinal alinement with the driving shaft, a housing upon the near ends of said shafts, a three gear rotary pump piston upon the end of the driving shaft in the housing, a three gear rotary motor piston upon the end of the driven shaft in the housing; a transmission liquid chambered in the housing, there being ports leading the liquid to the receiving side of the pump piston, ports leading from the discharge side of the pump piston to two sides of the motor piston, ports leading from the two sides of the motor piston, and ports forming two by-passes for the pump piston; means for reversing the direction of pressure from the pump upon the motor, means controlling the by-passes to vary the flow through the motor, means for stopping the flow through the motor with the by-passes closed, so as to rotate the housing, and a brake for the housing.

In testimony whereof, I have hereunto set my hand at Los Angeles, California, this 13th day of August, 1915.

HUDSON F. STORY.

In presence of—
JAMES R. TOWNSEND.